United States Patent
Kubota et al.

[11] Patent Number: 6,139,990
[45] Date of Patent: Oct. 31, 2000

[54] MODIFIED GRAPHITE PARTICLES DERIVED FROM SCALY NATURAL ONES, PRODUCTION THEREOF AND SECONDARY BATTERY

[75] Inventors: Satoshi Kubota; Hirokazu Koyanagi; Kojiro Tenno; Syun Saito, all of Amagasaki, Japan

[73] Assignee: Kansai Netsukagaku Kabushiki Kaisha, Amagasaki, Japan

[21] Appl. No.: 09/151,024

[22] Filed: Sep. 10, 1998

[30] Foreign Application Priority Data

Mar. 18, 1998 [JP] Japan ................................. 10-068532

[51] Int. Cl.[7] .......................... H01M 4/58; C01B 31/04; C09C 1/56
[52] U.S. Cl. .................................. 429/231.8; 429/231.4; 423/445 R; 423/448; 423/460; 423/461
[58] Field of Search .............................. 429/231.4, 231.8; 423/445 R, 448, 460, 461

[56] References Cited

U.S. PATENT DOCUMENTS

| | | | |
|---|---|---|---|
| 5,426,006 | 6/1995 | Delnick et al. | 429/218 |
| 5,612,155 | 3/1997 | Takami et al. | 429/218 |
| 5,951,959 | 9/1999 | Nishimura | 423/447.1 |

FOREIGN PATENT DOCUMENTS 8-213020 8/1996 Japan .
8-298117 11/1996 Japan .

OTHER PUBLICATIONS

B.D. Cullity, Elements of X–Ray Diffraction, 2nd Ed., pp. 401–402, 1978.

Primary Examiner—Maria Nuzzolillo
Assistant Examiner—Angela J. Martin
Attorney, Agent, or Firm—Armstrong, Westerman, Hattori, McLeland & Naughton

[57] ABSTRACT

There are provided modified and rounded graphite particles derived from scaly natural graphite particles by modification so as to bring their form close to a spherical form and satisfying all the following requirements (a) to (c): (a) that the degree of circularity should be not less than 0.86; (b) that, upon microscopic observation, the broken-out section should show a cabbage-like appearance with graphite slices taking various directions; and (c) that, upon X ray diffraction, the peak intensity ratio ($Ih_{110}/Ih_{002}$) between the 002 face (parallel to graphite layers) and 110 face (perpendicular to graphite layers), which serves as an index of the randomness of orientation, should be not less than 0.0050. They retain good qualities of the raw material scaly natural graphite particles and are additionally unique in structure and characteristics. A method of producing such modified particles is also provided. Further provided are secondary cells or batteries in which the modified particles showing good slurry characteristics are used as an electrode material and with which the decrease in discharge capacity is small even at high discharge current values.

3 Claims, 6 Drawing Sheets

$$\text{degree of circularity} = \frac{\text{circumferential length of equivalent circle}}{\text{circumferential length of projected particle image}}$$

MODIFIED GRAPHITE PARTICLES DERIVED FROM SCALY NATURAL ONES, PRODUCTION THEREOF AND SECONDARY BATTERY

FIELD OF THE INVENTION

The present invention relates to modified graphite particles derived from scaly natural graphite particles by bringing their form close to a spherical form, to a method of producing the same, and to a secondary battery in which said modified particles are used as an electrode material.

PRIOR ART

Natural graphite is generally processed as follows: crude ore is roughly ground, then intermediately ground, refined by physical or chemical means for attaining elevated purity, and further ground to a desired particle size.

As regards the size reduction to a desired particle size, the monograph "Saishin Funryutai Process Gijutsu Shusei (Process Hen) (Compilation of Modern Powder Processing Technologies (Book of Processes)", first edition, first printing, published Mar. 15, 1974, Kabushiki Kaisha Sangyo Gijutsu Center, describes, in Chapter 25, Graphite, page 275, as follows: "Friction type grinding tends to give flat particles, while fluid energy type grinding gives particles having a rather round shape with corners rounded off presumably due to increased friction among particles. In the case of impact friction type grinding, the grinding process itself advances satisfactorily but, when a fine powder smaller than 1 μm in particle size is produced, particles are ready to coalesce to form aggregates, causing a decrease in bulk density, for instance, whereby the powder apparently feels rough in certain instances." In FIG. 25.3 on pages 274–275, photos showing morphological changes of particles resulting from such grinding processes are given.

Japanese Kokai Tokkyo Koho Nos. H08-213020 and H08-298117 (in both, the applicant being the instant applicant) disclose a method of grinding scaly natural graphite using a jet mill, with examples in which the grinding is performed using a Hosokawa Micron's Micron jet mill or Alpine's counter jet mill. These publications contain an explanation to the effect that whereas ordinary attrition or grinding down of scaly natural graphite by friction using ball mills or the like causes fracture to a crushed and squashed state, jet mill grinding cut such graphite sharply to pieces while retaining the scaly shape.

Scaly natural graphite can be used as an electrode material for secondary cells, in particular as a negative electrode material for lithium-ion secondary cells. For use in these applications, scaly natural graphite is often blended with a solvent and a binder to give a slurry, which is then spread on articles to be coated. In this case, scaly natural graphite, which literally occurs as scaly (plate-like) particles, shows poor fluidity in the step of mixing with solvent and binder and, for attaining a desired viscosity, the solvent is required in large amounts, with the result that coat layers having a desired thickness may not be formed. Therefore, for fluidity improvement, the prior art has employed the method comprising conducting grinding until the particle size amounts to several μm, the method comprising adding various surfactants to thereby secure fluidity, and the method comprising vigorously stirring for a long period of time, among others.

Although the above-cited "Saishin Funryutai Process Gijutsu Shusei (Process Hen)" mentions that fluid energy type grinding gives particles having a rather round shape with corners rounded off, the description merely means that the corners of natural graphite particles are rounded off in the category of grinding but does not mean that said particles are made spheroidal.

The description in the above-cited Japanese Kokai Tokkyo Koho H08-213020 and H08-298117 is also intended to mean that scaly natural graphite is ground in the category of grinding without loss of the scaly shape.

While it is known that scaly natural graphite particles can be ground as mentioned above, it is believed to be unknown that scaly natural graphite particles could be made spheroidal by modification processing thereof so as to bring their shape close to a spherical form.

The process for finely dividing scaly natural graphite to secure fluidity so that said graphite can be used as an electrode material for secondary cells is difficult to carry out in practice for attaining a particle size of 5 μm or less because of the slip characteristics of graphite. When the size is larger than 5 μm, the fluidity improving effect is unsatisfactory. In some applications, an excessively small particle size is unfavorable but one cannot cope with such a case. The addition of surfactants is indeed effective for fluidity improvement but it is difficult to balance the surfactant selected against the addition level; in many instances, it is difficult to constantly maintain an optimum condition. In certain applications, the use of surfactants is undesirable, hence unsuited. The method involving long-period vigorous stirring for fluidity improvement requires time and labor, hence is inevitably disadvantageous from the industrial viewpoint. In addition, even vigorous stirring often fails to attain necessary fluidity.

With such a background, it is an object of the present invention to provide modified graphite particles made spheroidal and having a unique structure and unique characteristics by modifying the raw material scaly natural graphite particles while retaining favorable properties thereof, to provide a method of producing such modified graphite particles from scaly natural graphite particles, and to provide a secondary battery in which an electrode material comprising such modified particles and having good slurry characteristics is used and which shows a slight decrease in discharge capacity at a great discharge current value.

SUMMARY OF THE INVENTION

The modified graphite particles derived from scaly natural graphite particles by modification so as to bring their form close to a spherical form according to the present invention are characterized in that said modified particles satisfy all the following requirements (a) to (c):

(a) that the degree of circularity should be not less than 0.86;
(b) that, upon microscopic observation, the broken-out section should show a cabbage-like appearance with graphite slices taking various directions; and
(c) that, upon X ray diffraction (reflection diffraction), the peak intensity ratio ($Ih_{110}/Ih_{002}$) between the 002 face (parallel to graphite layers and 110 face (perpendicular to graphite layers), which serves as an index of the randomness of orientation, should be not less than 0.0050.

The method of the present invention for producing modified graphite particles from scaly natural graphite particles is characterized by carrying out batchwise the procedure comprising charging scaly natural graphite particles into a vessel (1) having a collision zone, in which jet air streams collide with each other, and a fluidizing zone from a feeder (2), while blowing jet air streams into the vessel (1) from opposed nozzles (3) disposed in vessel (1) at a lower level to thereby cause graphite particles to collide with one another in the collision zone occurring lower than the fluidizing zone and circulate and fluidize them in the fluidizing zone occurring higher than the collision zone, during which a fraction of particles finer than the classification limit is discharged through a classifier (4) disposed in vessel (1) at the highest level, to give modified graphite particles made spheroidal and satisfying all the following requirements (a) to (c):

(a) that the degree of circularity should be not less than 0.86;
(b) that, upon microscopic observation, the broken-out section should show a cabbage-like appearance with graphite slices taking various directions; and
(c) that, upon X ray diffraction (reflection diffraction), the peak intensity ratio ($Ih_{110}/Ih_{002}$) between the 002 face (parallel to graphite layers) and 110 face (perpendicular to graphite layers), which serves as an index of the randomness of orientation, should be not less than 0.0050.

The secondary battery of the present invention comprises the above-mentioned modified graphite particles derived from scaly natural graphite particles as an electrode material.

BRIEF DESCRIPTION OF THE DRAWINGS

In FIG. 1, the reference numeral 1 indicates a vessel, 2 a feeder, 3 one of opposed nozzles, 4 a classifier and 5 a blow-up nozzle.

DETAILED DESCRIPTION OF THE INVENTION

Figure 1:
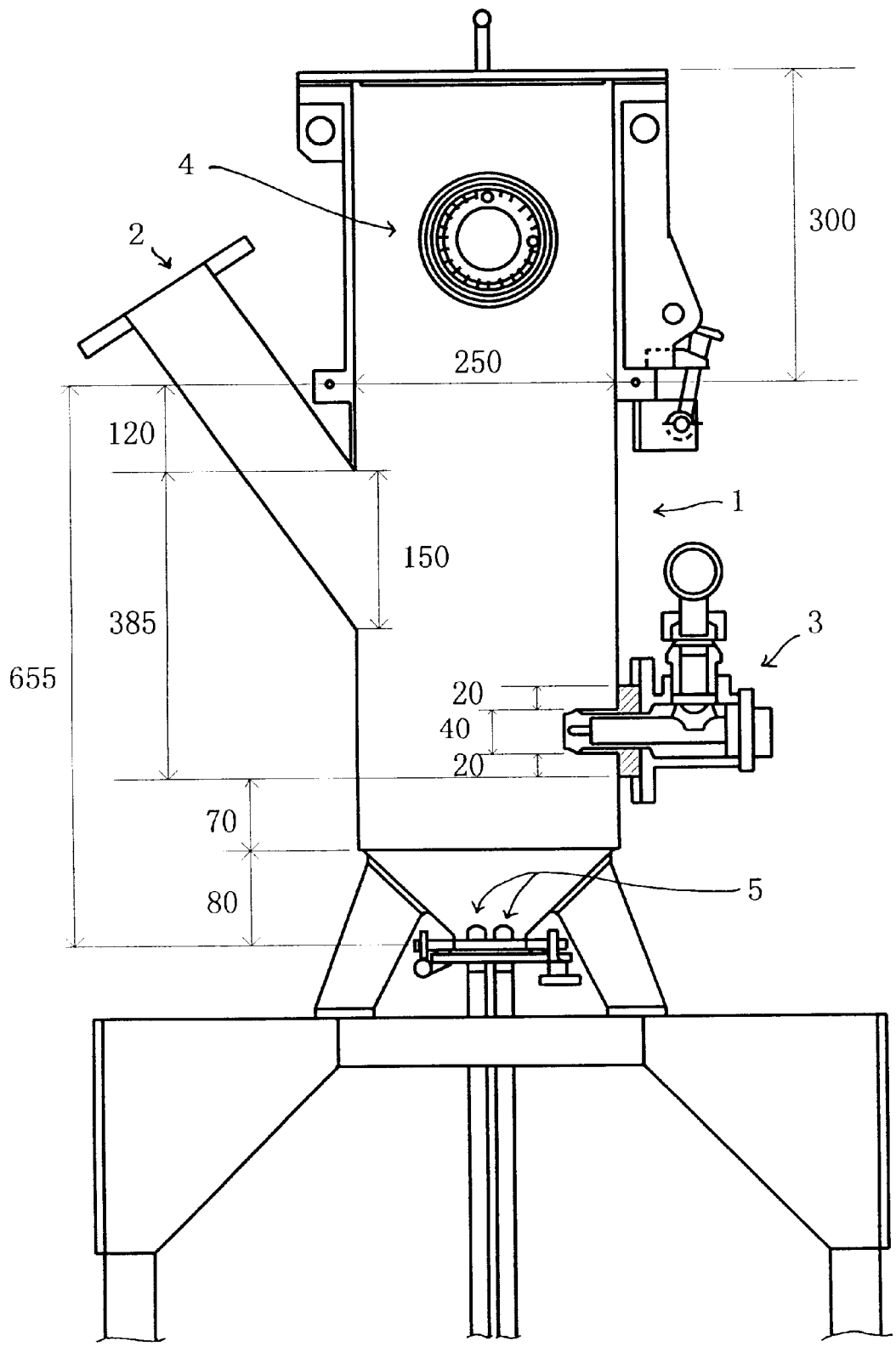
FIG. 1 is a schematic representation of an apparatus used in experimentally producing modified graphite particles from scaly natural graphite particles in accordance with the present invention.

<Modified Graphite Particles Derived from Scaly Natural Ones>

The modified graphite particles derived from scaly natural ones according to the present invention are modified particles made spheroidal by bringing the form of scaly natural graphite particles close to a spherical form and satisfy all the following requirements (a) to (c):

(a) that the degree of circularity should be not less than 0.86;
(b) that, upon microscopic observation, the broken-out section should show a cabbage-like appearance with graphite slices taking various directions; and
(c) that, upon X ray diffraction, the peak intensity ratio ($Ih_{110}/Ih_{002}$) between the 002 face (parallel to graphite layers) and 110 face (perpendicular to graphite layers), which serves as an index of the randomness of orientation, should be not less than 0.0050. The method of determining the degree of circularity referred to above in (a) and the method of determining the peak intensity ratio $Ih_{110}/Ih_{002}$ referred to in (b) are to be defined and explained in the examples section to be mentioned later.

As regards the degree of circularity referred to in (a), the modified particles made spheroidal have a degree of circularity of not less than 0.86, preferably not less than 0.88. For reference, those scaly natural graphite particles which are available on the market have a degree of circularity of about 0.84, for instance. Although, when compared in terms of numerical value, the degree of circularity of the particles made spheroidal according to the present invention is apparently close to that of the raw material scaly graphite particles, an increment in degree of circularity actually reflects much more advanced roundness than is expected from the numerical value of degree of circularity, since the degree of circularity of a particle is an index determined by projecting it on a two-dimensional plane.

The appearance of a broken-out section as referred to in (b), which is related to the index of orientation (c), is representative of a characteristic feature of the rounded particles of the present invention as observable from the appearance viewpoint. It can be confirmed by microscopic observation that, at the raw material stage, scaly natural graphite particles are each composed of graphite slices forming layers arranged approximately in one and the same direction. On the contrary, the rounded particles of the present invention are each composed of graphite slices taking various directions and imparting a cabbage-like appearance to each particle. From this appearance, it can be seen that the rounded particles of the present invention each structurally is a chimera-like modification although the laminar structure of scaly natural graphite particles is still contained therein.

As regards the index of orientation, namely the peak intensity ratio $Ih_{110}/Ih_{002}$ between the 002 face (parallel to graphite layers) and 110 face (perpendicular to graphite layers), which serves as an index of the randomness of orientation, as referred to in (c), the peak intensity ratio of the rounded particles of the present invention, when determined by the X ray diffraction (reflection diffraction) method, is not less than 0.0050, preferably not less than 0.0080, more preferably not less than 0.0100. For reference, the peak intensity ratio $Ih_{110}/Ih_{002}$ of those scaly natural graphite particles which are available on the market is about 0.0015 to 0.0018 or so and thus markedly smaller as compared with the rounded particles of the present invention, indicating that the randomness is very low.

<Method of Producing Modified Graphite Particles from Scaly Natural Graphite Particles>

The modified graphite particles derived from scaly natural graphite particles which satisfy all the requirements (a), (b) and (c) mentioned above can be produced on an industrial scale preferably in the following manner.

Thus, said modified particles can be produced by using a vessel (1) having a collision zone, in which jet air streams collide with each other, and a fluidizing zone, charging scaly natural graphite particles into the vessel (1) from a feeder (2), while blowing jet air streams into the vessel (1) through opposed nozzles (3) disposed in vessel (1) at a lower level to thereby cause graphite particles to collide with one another in the collision zone occurring lower than the fluidizing zone and circulate and fluidize them in the fluidizing zone occurring higher than the collision zone, during which a fraction of particles finer than the classification limit is discharged through a classifier (4) disposed in vessel (1) at the highest level. The above procedure is carried out batchwise.

Scaly natural graphite particles with high crystallinity are used as the raw material graphite particles. Such scaly natural graphite can be obtained generally with a purity of from about 85% to 99% or higher. If necessary, the purity can be further increased by an appropriate means prior to modification.

The particle size of the scaly natural graphite particles to be charged as the raw material may vary depending on the intended use thereof, hence cannot be specified unconditionally. In cases where the modified particles are used as an electrode material for secondary cells, a mean particle size of about 1 to 100 μm, in particular about 5 to 60 μm, is employed in many instances.

The apparatus to be used for modifying the raw material scaly natural graphite particles is a vessel (1) having a collision zone, in which jet air streams collide with each other, and a fluidizing zone. Usable as this vessel (1) are fluidized bed type counter jet mills available on the market either as they are or after modification for the purpose of the present invention.

Scaly natural graphite particles are charged into the vessel (1) from a feeder (2) of vessel (1). The feeder (2) is preferably constructed as a hopper and disposed at an appropriate site of vessel (1). In that case, the feeder (2) can be utilized as a discharge port for the modified particles. The feeder (2) may also be constructed as a screw type one and disposed in the lower part of vessel (1). The charge amount of scaly natural graphite particles is determined in consideration of the effective space but need not be very strictly determined. If, however, the charge amount is excessively small, the flow of particles will be not so smooth. If the charge amount is excessively large, the fracture of particles will be excessive and it will be difficult to obtain modified particles having the desired properties.

In the lower part of vessel (1), there are disposed opposed nozzles (3) passing through the vessel wall, and jet air streams are blown into the vessel through the opposed nozzles to thereby cause particles caught by the jet air streams to collide with one another in the collision zone in the lower part of vessel (1). The number of the opposed nozzles is plural, preferably three. The velocity of the jet air streams to be fed through said opposed nozzles (3), the pressure of the gas to be fed, the vessel inside pressure and other parameters are selected so that smooth collision and flow can be attained, while the operation time is appropriately selected so that graphite particles can be rounded to a desired extent.

In the collision zone in the lower part of vessel (1), graphite particles collide with one another while, in the fluidizing zone in the upper part of vessel (1), particles are fluidized and circulated. In a steady state, particles are generally stirred up in the central portion of vessel (1) and fall down along the wall of vessel (1).

The vessel (1) is provided with a classifier (4) at the highest level and a fraction of particles finer than the classification limit is discharged there-through. A high-speed rotary classifier is generally used as the classifier (4). The discharge amount varies depending on the particle size of the scaly natural graphite particles used as the raw material.

It is important that the above procedure be carried out batchwise. When the procedure is carried out continuously, as in the case of usual jet mill grinding while feeding raw material particles continuously and discharging ground particles from the upper part of the vessel continuously, the desired modified particles cannot be obtained.

Rounded particles satisfying the above-mentioned requirements (a), (b) and (c) can be obtained by carrying out the above procedure under controlled conditions.

<Secondary Cell or Battery>

The above-mentioned rounded particles (modified graphite particles derived from scaly natural graphite particles) can be suitably used as an electrode material for non-aqueous secondary cells, in particular as a negative electrode material for lithium-ion secondary cells. They can be used also as an electrode material for polymer cells (paper cells) and the like. They can further be used not only as such electrode materials but also in various applications, for example as a component of conductive paints, a material for constructing friction elements of brake discs, and particles constituting electroviscous fluids.

The positive electrode material used in the lithium-ion secondary cell is $MnO_2$, $LiCoO_2$, $LiNiO_2$, $LiNi_{1-y}COO_2$, $LiMnO_2$, $LiMn_2O_4$, $LiFeO_2$ or the like. The electrolyte solution used therein is a solution of $LiPF_6$, $LiBF_4$, $LiClO_4$, $LiCF_3SO_3$ or the like in an organic solvent, such as ethylene carbonate, or a mixed solvent composed of such a solvent and a low-boiling solvent, such as dimethyl carbonate, diethyl carbonate, 1,2-dimethoxyethane, 1,2-diethoxymethane, ethoxymethoxyethane or the like.

In the case of lithium-ion secondary cells, the charge/discharge reaction is as shown below (the reaction from left side to right side being the charge reaction and the reaction from right side to left side being the discharge reaction), the lithium ion goes from the positive electrode to the negative electrode and vice versa.

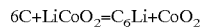

$$6C+LiCoO_2=C_6Li+CoO_2$$

<Operation>

By carrying out the batch procedure according to the present invention using a vessel (1) having a collision zone, in which jet air streams collide with each other, and a fluidizing zone, collision of particles with one another leads to modification, attrition and rounding of particles as resulting from aggregation, adhesion, contact bonding and growth of particles, among others, whereby the particle size distribution and orientation, among others, are changed to give modified, rounded particles satisfying all the above-mentioned requirements (a), (b) and (c).

These modified particles are close in shape to spheres and retain their scaly units which, however, are now uniquely oriented in a random manner. Therefore, when a slurry is prepared using these rounded particles, the slurry has a low viscosity and secures fluidity even when the amount of solvent is small in the step of slurry preparation, hence the solid content of the slurry can be increased. Furthermore, even after a long period of storage in the slurry state, precipitation is hardly observed. Even if precipitation is observed, round particles still retain spaces, avoiding complete coagulation, so that the precipitate-containing mixture can easily be returned to the slurry state by simple stirring just prior to use. When said particles are used as a negative electrode material for lithium-ion secondary cells, the decrease in discharge capacity at a high discharge current value becomes slight (the discharge rate capability is improved), so that said particles are suited for use as a negative electrode material of high-power, high-capacity batteries. This is presumably due to the fact that the particles in the graphite layer spread on a copper foil of the electrode have a round shape and that the scaly crystal units which the particles still have are randomly oriented in each particle and afford ample space, so that routes for passing the electrolyte solution are formed also in the direction perpendicular to the electrode, making the transfer of lithium ions smooth.

EXAMPLES

The following examples illustrate the present invention in further detail.

[Production of Modified Particles]

Examples 1 to 5 and Comparative Examples 1 and 2

Modified particles were produced in the following manner using scaly natural graphite as the raw material.

<Production Apparatus>

FIG. 1 is a schematic representation of an apparatus used in the experiment for producing modified graphite particles from scaly natural graphite particles. This test apparatus comprises a cylindrical vessel (1) (its dimensions being shown in the figure). In the lower part of vessel (1), there are oppositely disposed three nozzles (3) (the nozzle inside diameter being 6.3 mm) facing to the center (in FIG. 1 one of them alone being shown). At the top of vessel (1) is disposed a high-speed rotary classifier as an example of classifier (4). A feeder (2) is disposed on the side wall of vessel (1), and blow-up nozzles (5) are disposed on the bottom of vessel (1).

<Modification Procedure>

Scaly natural graphite from China (particle size: not less than 90% passing through a 100-mesh sieve; purity: not lower than 99%) was ground in a counter type jet mill to a mean particle size of 20 μm or 50 μm, for use as the raw material.

The above raw material particles were fed, in a predetermined amount (1 kg, 3 kg or 8 kg), to the vessel (1) from the feeder (2), while air was blown into the vessel from each of the three opposed nozzles (3). The modification processing of the particles was conducted for a predetermined period of time. During the processing, a fine powder fraction composed of particles less than about 5 μm in size was discharged by means of the classifier (4) disposed on the top.

After the above procedure, air was blown into the vessel (1) through the blow-up nozzles (5) to thereby discharge the modified particles through the feeder (2). The desired rounded (modified) particles were thus obtained.

<Broken-out Section of the Modified Particle and Appearance of Raw Material Particles>

Figure 2:
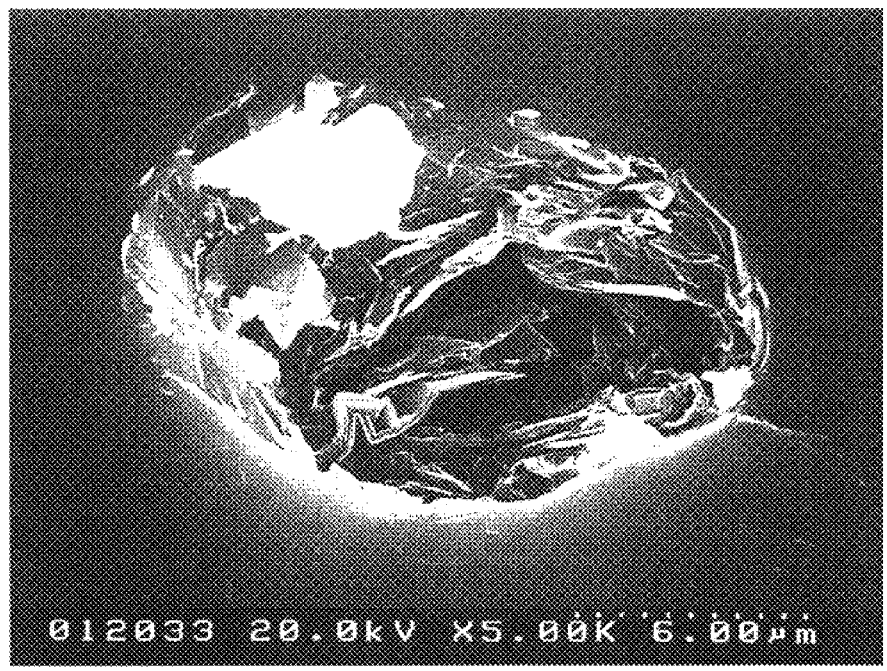
FIG. 2 is a facsimile of a photomicrograph (magnification×5,000) of the broken-out section of a rounded graphite particle (modified particle obtained in Example 2) according to the present invention as produced by fixing the particle with an epoxy resin, followed by freezing with liquefied nitrogen for solidification, further followed by fracture.

FIG. 2 is a facsimile of a photomicrograph (magnification×5,000) of the broken-out section of a rounded graphite particle (modified particle obtained in Example 2) according to the present invention as produced by fixing the particle with an epoxy resin, followed by freezing with liquefied nitrogen for solidification, further followed by fracture. It is seen from FIG. 2 that the rounded (modified) particle of the present invention has a cabbage-like appearance with graphite slices taking various directions or, in other words, said particle has a structure modified in a chimera-like manner although it still contains the laminar structure of scaly natural graphite.

Figure 3:
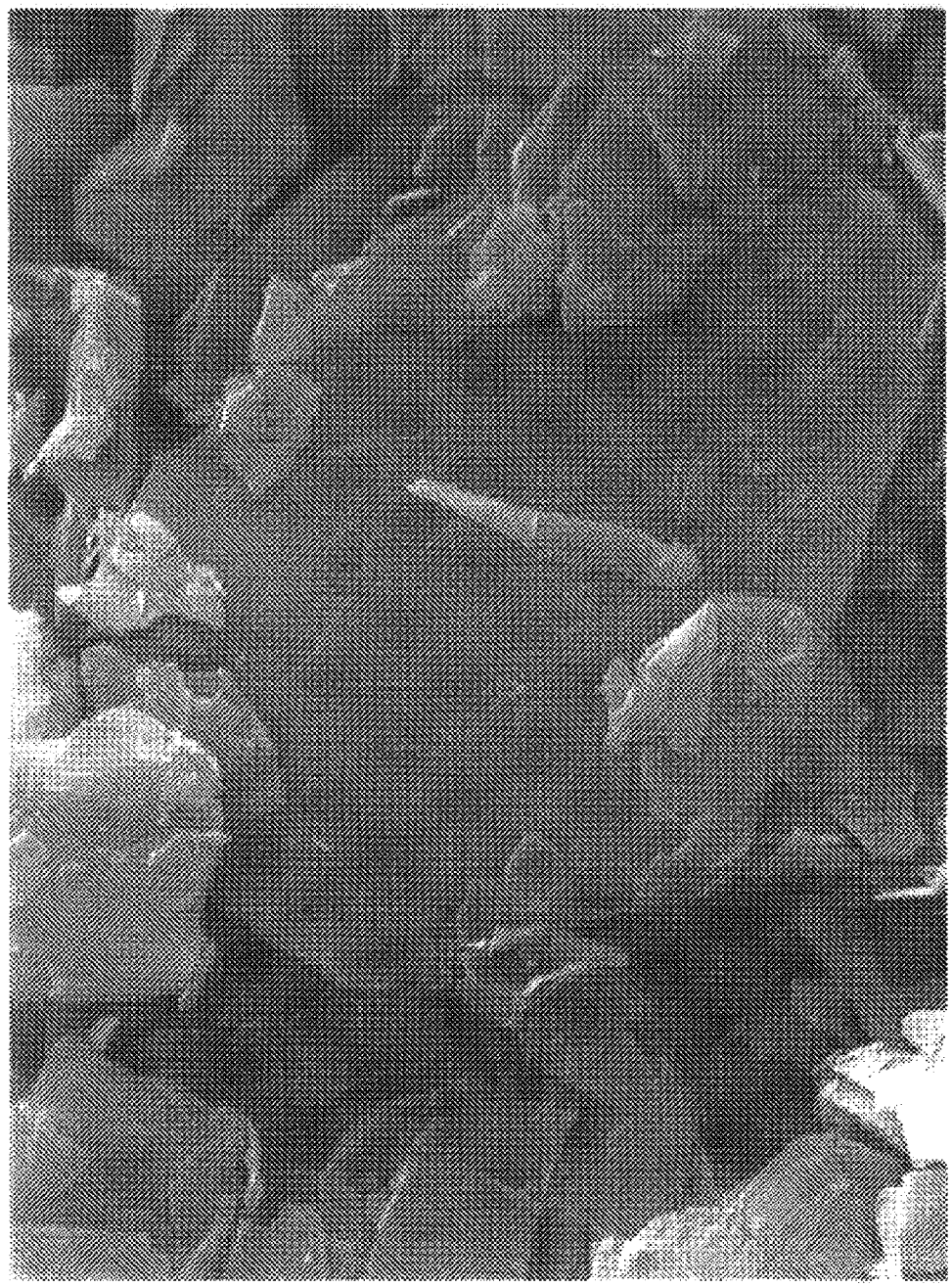
FIG. 3 is a facsimile of a photomicrograph (×2,000) showing the appearance of scaly natural graphite particles used as a raw material.

FIG. 3 is a facsimile of a photomicrograph (×2,000) showing the appearance of scaly natural graphite particles used as the raw material. It is evident from FIG. 3 that, in the raw material scaly natural graphite particles, graphite slices are arranged in a laminar manner taking almost one and the same direction.

<Degree of Circularity of Modified Particles>

Photos were taken of the rounded particles obtained in the examples and the scaly natural graphite particles used as the raw material and, for particles with a diameter of not less than 10 μm, the degree of circularity of each particle species was calculated as follows:

Degree of circularity=(circumferential length of equivalent circle)/(circumferential length of projected image of particle).

Figure 4:
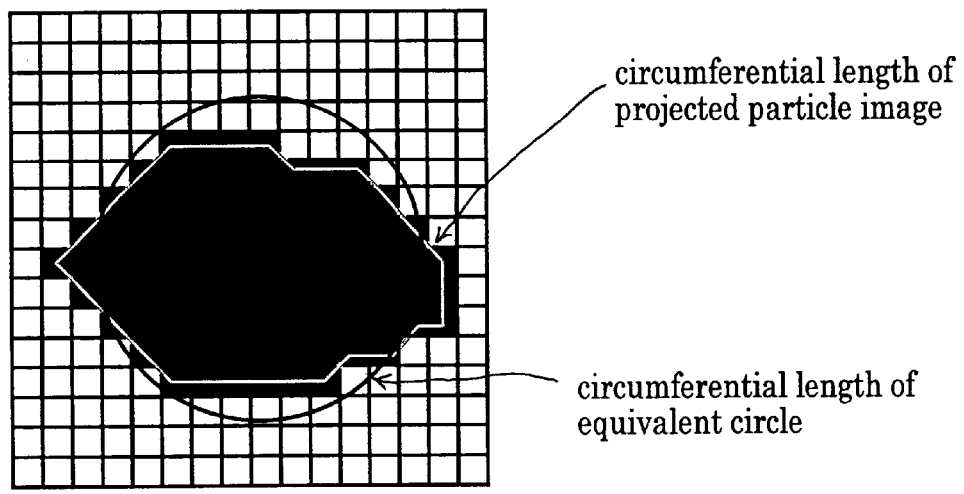
FIG. 4 is a schematic illustration of the method of determining the degree of circularity of a particle.

The scaly natural graphite particles had a degree of circularity of 0.84, irrespective of particle size, while the rounded particles of the present invention had an increased degree of circularity of 0.88 to 0.92. The "equivalent circle" as referred to herein is a circle having the same projection area as that of the particle image photographed. The circumferential length of the projected image of a particle is the length of a contour line obtained by connecting two-valued edge points of the image of the particle. FIG. 4 is a schematic illustration of the method of determining the degree of circularity of a particle, the circumferential length of the circle in black being the circumferential length of the equivalent circle and the circumferential length of the polygon defined by the polygonal line in white being the circumferential length of the projected particle image.

<Orientation in the Modified Particles>

The peak intensity ratio $Ih_{110}/Ih_{002}$ between the 002 face (parallel to graphite layers) and 110 face (perpendicular to graphite layers), which serves as an index of the randomness of orientation, was determined by the X ray diffraction method under the following conditions. In preliminary experiments, it had been confirmed that the influence of the scanning speed and rotational speed is slight.

Apparatus: "RINT 2000" (product of Rigaku Kabushiki Kaisha);

Cell: 2.4 cm in inside diameter, 0.315 cm in height;

Sample charging into cell: Two grams of the powder is weighed and placed in a mold (1.2 cm in radius) and pressed under a load of 500 kg until the thickness amounts to 0.315 cm.

Sample density: $2.0 \text{ g}/[(1.2)^2 \text{ cm}^2 \times \pi \times 0.315 \text{ cm}] = 1.40 \text{ g/cm}^3$ (same as the electrode density in cell testing);

Measurement angle: 3 to 90°;

Scanning speed: 9°/min;

Rotational speed: 60 rpm;

Data processing: Intensity integration calculation; number of smoothing points=9; automatic background elimination. Based on the areas of the 002 face peak (26.5°) and 110 face peak (77.5°), the peak intensity ratio was calculated as follows:

Peak intensity ratio $Ih_{110}/Ih_{002}$=(net Int (002) face)/(net Int (110) face).

Figure 5:
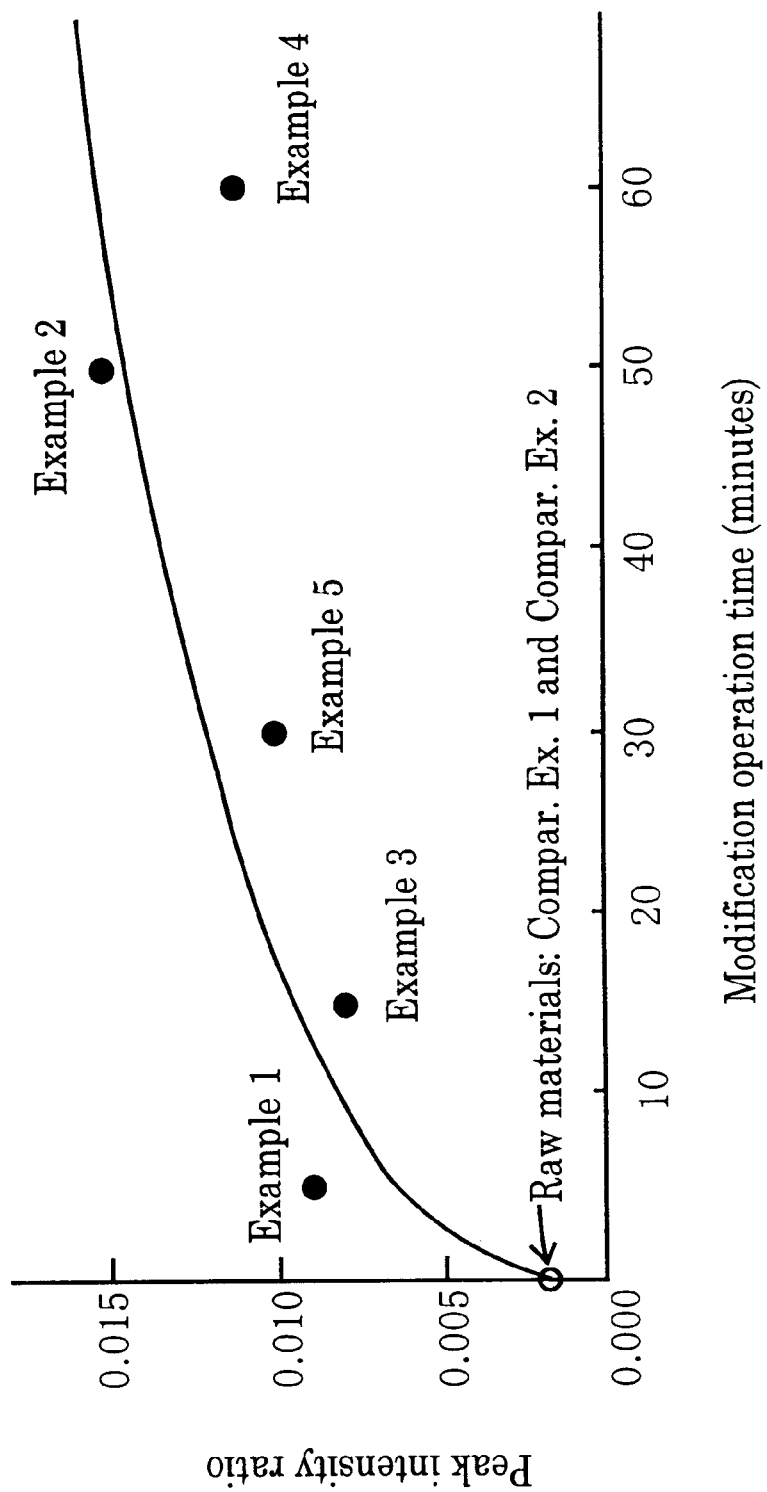
FIG. 5 is a graphic representation of the relationship between modification process time and peak intensity ratio.

As a result, the peak intensity ratio of the rounded particles according to the present invention was 0.0072 to 0.0150, indicating a marked increase in numerical value as compared with the peak intensity ratio of 0.0015 or 0.0018 found with the raw material scaly natural graphite particles. The advancement in randomness of orientation was thus revealed. The relationship between the period of modification procedure and the peak intensity ratio is graphically shown in FIG. 5.

<Summarized Conditions and Results>

The conditions and results are summarized below in Table 1. In Examples 1 and 2, the modification procedure was carried out using the raw material particles of Comparative Example 1. In Examples 3 to 5, the modification procedure was carried out using the raw material particles of Comparative Example 2. The air speed is the rate of flow in the portion having an inside diameter of 250 mm in vessel (1). The bulk density was determined by placing 30 to 50 g of particles in a 100-cc measuring cylinder, patting the cylinder wall and then measuring the volume.

TABLE 1

|  | Comparative Example/raw particles | | Example/modified Particles | | | | |
| --- | --- | --- | --- | --- | --- | --- | --- |
|  | 1 | 2 | 1 | 2 | 3 | 4 | 5 |
| Amount of raw material charged (kg) | — | — | 1 | 3 | 1 | 8 | 1 |
| Air pressure (kg/cm$^2$) | — | — | 1 | 1 | 1 | 1 | 2 |
| Volume of air (m$^3$/min) | — | — | 2.2 | 2.2 | 2.2 | 2.2 | 3.3 |
| Air speed (m/sec) | — | — | 0.75 | 0.75 | 0.75 | 0.75 | 1.12 |
| Operation time (min) | — | — | 5 | 50 | 15 | 60 | 30 |
| Particle size (μm) | 20 | 50 | 17 | 10 | 45 | 37 | 40 |
| Degree of circularity (–) | 0.84 | 0.84 | 0.84 | 0.90 | 0.91 | 0.91 | 0.92 |
| Bulk density (g/cc) | 0.3 | 0.5 | 0.6 | 0.8 | 0.8 | 0.9 | 0.9 |
| Peak intensity ratio | 0.0015 | 0.0018 | 0.0087 | 0.0150 | 0.0072 | 0.0110 | 0.0092 |

<Relationship between degree of circularity and modification operation time>

Figure 6:
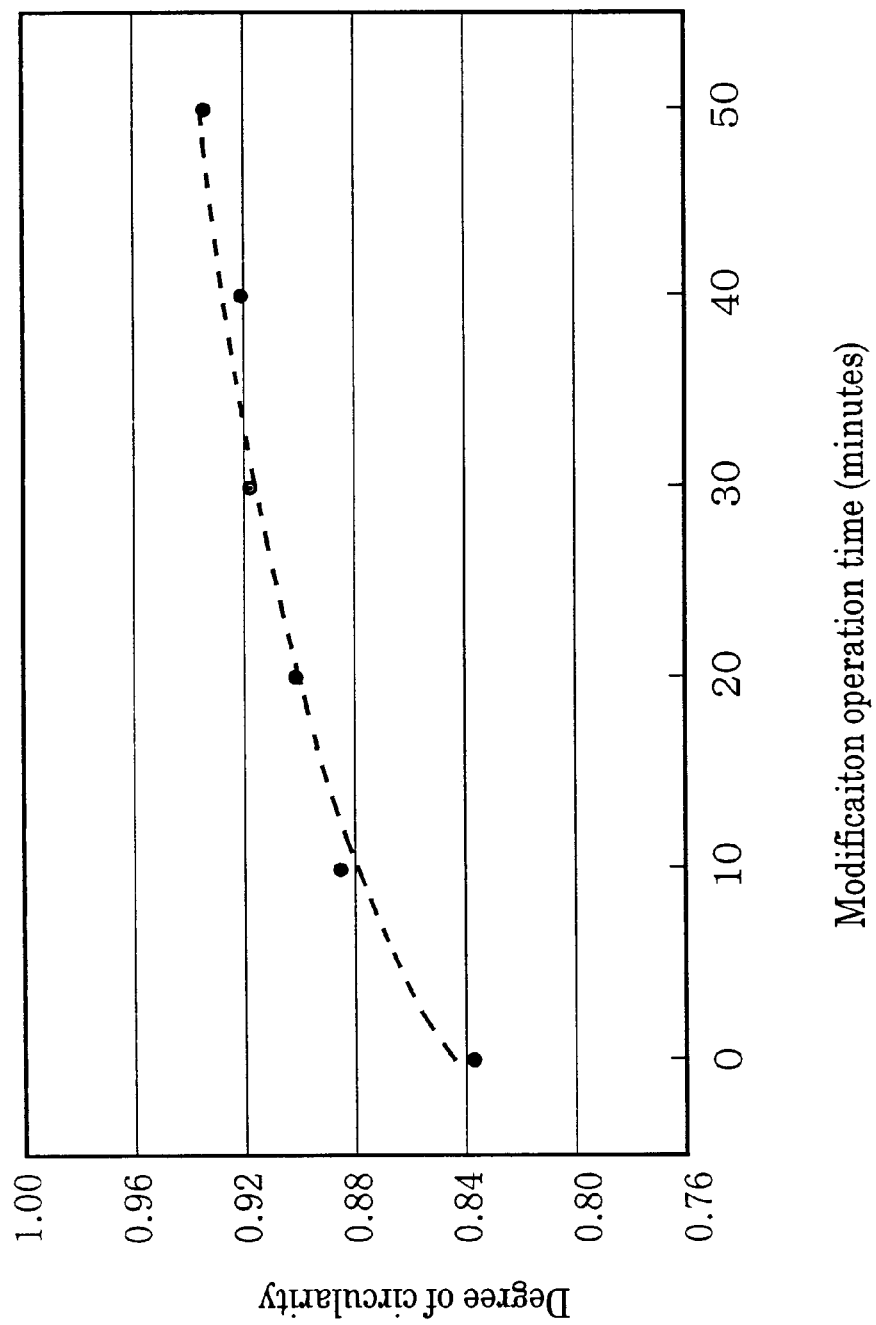
FIG. 6 is a graphic representation of the relationship between degree of circularity and modification process time.

The raw material particles of Comparative Example 2 were modified using various modification operation times, namely 10 minutes, 20 minutes, 30 minutes, 40 minutes and 50 minutes and the relationship between modification operation time and degree of circularity was examined. The results are shown in FIG. 6.

[Secondary Cells]

<Slurry Evaluation>

For evaluating the aptitude for use as a negative electrode material in lithium-ion secondary cells, the following experiment was carried out using the raw material particles of Comparative Examples and the modified particles of Examples.

Slurries were prepared by mixing under stirring 100 parts by weight of the raw material particles of Comparative Examples 1 or 2 or the modified particles obtained in one of Examples 1 to 5, 3 parts by weight of polyvinylidene fluoride as a binder and an appropriate amount of N-methylpyrrolidone as a solvent. The slurry concentrations at which a viscosity of 600 cps/20 ■ (measured with a spiral rotating viscometer), at which the fluidity is good and suited for application operation, was obtained were as shown below. It was revealed that the solid concentration of the slurry can be increased by using the modified particles of the Examples.

Raw material particles of Comparative Example 1—26% by weight;
Raw material particles of Comparative Example 2—30% by weight;
Modified particles of Example 1—35% by weight;
Modified particles of Example 2—35% by weight;
Modified particles of Example 3—40% by weight;
Modified particles of Example 4—38% by weight;
Modified particles of Example 5—38% by weight.

When allowed to stand at room temperature for a week, all the slurries thus prepared showed layer separation with precipitation of particles. However, slurry reconstruction could more easily be achieved by simple stirring when the modified particles of the Examples were used as compared with the cases in which the raw material particles of the Comparative Examples were used.

<Cell Testing and Charge and Discharge Characteristics>

The above-mentioned slurries prepared by using the raw material particles of Comparative Examples 1 or 2 or the modified particles of Examples 2 or 5 were respectively spread on a copper foil and then dried, the electrode density was adjusted to 1.4 g/cc by pressing and test electrodes were prepared. Using these and counter electrodes prepared by bonding under pressure a lithium foil to a stainless steel plate, two-electrode cells were constructed. The assemblage was conducted in a dry box adjusted to a moisture content of 20 ppm or below. The electrolyte solution used was a 1 M solution of LiPF$_6$ in a mixed solvent composed of ethylene carbonate and diethyl carbonate (1:1 by volume), namely 1 M LiPF$_6$/(EC+DEC (1:1)).

The charge/discharge test was performed at a discharge current of 0.05 C (0.2 mA/cm$^2$), 1.0 C (3.7 mA/cm$^2$) or 2.0 C (8.0 mA/cm$^2$). In all the cases, charging was performed at 0.1 mA/cm$^2$. The results of charge/discharge performance testing are shown below in Table 2. From Table 2, it is seen that, in the Examples 2 and 5, the decrease in discharge capacity at the discharge current value of 2 C was reduced, namely that the particles of the Examples are suited for use as a negative electrode material in high-power, high-capacity cells or batteries.

TABLE 2

|  | Discharge current | | | Capacity ratio |
| --- | --- | --- | --- | --- |
|  | 0.05 C. | 1.0 C. | 2.0 C. | (%) |
| Compar. Example 1 | 345 | 280 | 110 | 32 |
| Compar. Example 2 | 345 | 322 | 142 | 41 |
| Example 2 | 345 | 340 | 270 | 78 |
| Example 5 | 340 | 340 | 280 | 82 |

\# The numerical value in the discharge current column is the discharge capacity (mAh/g).
\# The capacity ratio is 100 × (discharge capacity at 2.0 C.)/(discharge capacity at 0.05 C.).

Effects of the Invention

The modified graphite particles derived from scaly natural graphite particles according to the invention are high in degree of circularity, show a broken-out section revealing, upon microscopic observation, a unique cabbage-like appearance with graphite slices taking various directions. Upon X ray diffraction, the peak intensity ratio $Ih_{110}/Ih_{002}$ between the 002 face (parallel to graphite layers) and 110 face (perpendicular to graphite layers), which serves as an index of the randomness of orientation, is remarkably high with them.

Therefore, even when the solid concentration is increased in the step of slurry preparation (i.e. the solvent amount is decreased), a viscosity suited for application can be obtained and the slurries produced show good workability and show good applicability and bonding in the step of electrode plate manufacture by applying them to a copper foil or the like.

Furthermore, when used as a negative electrode material for lithium-ion secondary cells, for instance, the modified particles reduce the decrease in discharge capacity at high discharge current values, hence are suited for use as a negative electrode material for high-power, high-capacity cells or batteries.

The modified particles can be produced with ease by carrying out the batchwise procedure using the vessel (1) having a collision zone, in which jet air streams collide with each other, and a fluidizing zone, hence are advantageous from the industrial productivity viewpoint as well.

What is claimed is:

1. Modified graphite particles derived from scaly natural graphite particles, characterized in that said modified particles satisfy all of the following requirements (a) to (c):

(a) that the degree of circularity should be not less than 0.86;

(b) that, upon microscopic observation, the broken-out section should show an appearance with graphite slices taking various directions;

and (c) that, upon X ray diffraction, the peak intensity ratio ($Ih_{110}/Ih_{002}$) between the 002 face (parallel to graphite layers) and 110 face (perpendicular to graphite layers), which serves as an index of the randomness of orientation, should be not less than 0.0050.

2. A method of producing modified graphite particles derived from scaly natural graphite particles and satisfying all the following requirements (a) to (c):

(a) that the degree of circularity should be not less than 0.86;

(b) that, upon microscopic observation, the broken-out section should show an appearance with graphite slices taking various directions; and (c) that, upon X ray diffraction, the peak intensity ratio ($Ih_{110}/Ih_{002}$) between the 002 face (parallel to graphite layers) and 110 face (perpendicular to graphite layers), which serves as an index of the randomness of orientation, should be not less than 0.0050, which method comprises charging scaly natural graphite particles into a vessel (1) having a collision zone, in which jet air streams collide with each other, and a fluidizing zone from a feeder (2), while blowing jet air streams into vessel (1) through opposed nozzles (3) disposed in the lower part of vessel (1) to thereby cause graphite particles to collide with one another in the collision zone occurring lower than the fluidizing zone and circulate and fluidize them in the fluidizing zone occurring higher than the collision zone, during which a fraction of particles finer than the classification limit is discharged through a classifier (4) disposed in vessel (1) at the highest level, the above procedure being carried out batchwise.

3. A secondary battery in which modified graphite particles derived from scaly natural graphite particles as specified in claim 1 are used as an electrode material.

* * * * *